(12) United States Patent
Guillory

(10) Patent No.: US 7,049,971 B2
(45) Date of Patent: May 23, 2006

(54) SYSTEM FOR SELECTIVE NOTIFICATION OF SEVERE WEATHER EVENTS

(76) Inventor: Andre P. Guillory, 150 Peachwood Dr., Haysville, KS (US) 67060

( * ) Notice: Subject to any disclaimer, the term of this patent is extended or adjusted under 35 U.S.C. 154(b) by 6 days.

(21) Appl. No.: 09/804,772

(22) Filed: Mar. 13, 2001

(65) Prior Publication Data

US 2002/0075155 A1    Jun. 20, 2002

Related U.S. Application Data

(60) Provisional application No. 60/189,160, filed on Mar. 14, 2000.

(51) Int. Cl.
  *G01W 1/00* (2006.01)

(52) U.S. Cl. .............. 340/601; 340/539.1; 340/286.01; 702/3

(58) Field of Classification Search ................ 340/601, 340/539, 602, 286.01, 945, 968, 539.1; 702/3; 342/26
See application file for complete search history.

(56) References Cited

U.S. PATENT DOCUMENTS

| | | | | |
|---|---|---|---|---|
| 4,402,672 A * | 9/1983 | Lowe, Jr. | ..................... | 434/217 |
| 4,632,052 A | 12/1986 | Green | ..................... | 116/70 |
| 4,682,153 A * | 7/1987 | Boozer et al. | ..................... | 340/507 |
| 4,812,825 A | 3/1989 | Kennedy et al. | ..................... | 340/601 |
| 5,083,106 A * | 1/1992 | Kostusiak et al. | ..................... | 340/506 |
| 5,355,350 A | 10/1994 | Bass et al. | ..................... | 367/13 |
| 5,546,800 A | 8/1996 | Daniel | ..................... | 73/170.16 |
| 5,574,999 A * | 11/1996 | Gropper | ..................... | 455/186.1 |
| 5,801,636 A | 9/1998 | Tatom et al. | ..................... | 340/690 |
| 6,018,699 A * | 1/2000 | Baron, Sr. et al. | ..................... | 702/3 |
| 6,021,177 A * | 2/2000 | Allport | ..................... | 379/48 |
| 6,084,510 A * | 7/2000 | Lemelson et al. | ..................... | 340/539.13 |
| 6,112,074 A * | 8/2000 | Pinder | ..................... | 455/404.2 |
| 6,177,873 B1 * | 1/2001 | Cragun | ..................... | 340/601 |
| 6,255,953 B1 * | 7/2001 | Barber | ..................... | 340/601 |
| 6,295,001 B1 * | 9/2001 | Barber | ..................... | 340/601 |
| 6,590,529 B1 * | 7/2003 | Schwoegler | ..................... | 342/357.13 |

* cited by examiner

*Primary Examiner*—Phung T. Nguyen
(74) *Attorney, Agent, or Firm*—Lathrop & Gage, LC

(57) ABSTRACT

A system for sending an effective warning signal to receivers in a predetermined area. A transmitter, activated by a local authority, sends a severe weather warning signal to a plurality of receivers. Cities or counties within the predetermined area are divided into subdivisions thereof called sectors, each of which represents an area that is selectively addressable by the transmitter. Each of the receivers has a programmable sector code which has been programmed according to the location of the home or office in which it is placed. When activated, the transmitter sends radio frequency warning signals which contain digitally encoded information indicating the sector to which the warning applies. Upon receiving the warning signal, each receiver that has been programmed with the sector code being transmitted responds by generating an audible alert or other warning signal. In one embodiment, the transmitter sending the warning signal is connected to, and activated by, the same mechanism that activates a corresponding warning siren.

18 Claims, 3 Drawing Sheets

SYSTEM FOR SELECTIVE NOTIFICATION OF SEVERE WEATHER EVENTS

CROSS REFERENCE TO RELATED APPLICATION

This application claims benefit of priority to U.S. Application Ser. No. 60/189,160, filed Mar. 14, 2000, and entitled In Home/Office Tornado Alert System, which is incorporated herein by reference.

BACKGROUND OF THE INVENTION

1. Technical Field

The present invention relates generally to emergency warning systems, and more particularly, to a system for selectively providing a warning of the threat of imminent severe weather, such as a tornadoes, in a specific area.

2. Statement of the Problem

Most of the tornado warning systems in use today are leftover relics of the Civil Defense System era. Some have been upgraded and expanded and some have not. These systems employ sirens which were not originally designed to warn people inside their homes in noisy, violent weather conditions such as those that precede and accompany tornadoes. One way of overcoming this limitation would be to install many times the number of sirens currently used in these systems, but this solution is cost prohibitive. Even in areas with modernized, well-maintained siren systems, vast numbers of people simply cannot hear the sirens from inside their homes or offices. As a result, tornadoes continue to kill and injure large numbers of people who would have taken shelter if they had received a proper warning.

Beginning in the late 1950's, the National Weather Service (NWS), then the U.S. Weather Bureau, started developing a voice radio broadcast systems to provide more frequent and specialized weather information to the general public and users with unique weather needs than was available from the commercial radio and television services. Coverage from stations during this period was primarily confined to large urbanized cities and along the coasts. The service was eventually named NOAA Weather Radio (NWR). Starting in 1985 the NWS began inserting special digital codes at the beginning and end of any NWR message about a life or property threatening event. The intent was to ultimately transmit a code with the initial broadcast of all NWR messages. This system evolved into what is known today as NWR-Specific Area Message Encoding ("S.A.M.E.").

The NWR-SAME process is achieved using an encoder panel consisting of a number of buttons representing the functions to be performed, types or content of messages, the affected areas, and valid time of the message. A microprocessor in the panel interprets button active status and creates the proper codes and places them at the beginning and end of each message. The panel is electronically connected to the various types of message programming and playback consoles used by the NWS to broadcast messages over the NWR transmitters. In the S.A.M.E. system, the geographic area affected by the message is encoded to allow for subdividing the target area into smaller partitions in the case of very large or uniquely shaped area, or because of widely varying height, climate, or other geographic features. It should be noted, however, that the S.A.M.E. system has neither the intention nor the provision for subdividing a target area according to demographic criteria such as that used for locating warning sirens.

As structured, a S.A.M.E. message has a county indicator code that is capable of being subdivided into a maximum of 9 sub-areas. Furthermore, weather forecast information for a given area is generated only at one of the relatively few NWS Weather Forecast Offices, which, being limited in number, are thus not able to provide the granularity of information (both temporal and geographic) available to weather observers in each local community. The National Weather Service presently plans to create a total of 121 Weather Forecast Offices to provide all warning and forecast services for the area consisting of the 50 States and the U.S. territories. This means that, on the average, there are fewer than three forecast offices per state. In fact, Kansas, which incurs the fourth most tornadoes of any of the states, has only three such offices to cover an area of over 82,000 square miles. It is clear, therefore, that these three offices simply cannot provide timely warnings having anywhere near the geographical precision afforded by the much larger number of entities located in individual communities. Visual sightings are frequently the only manner in which fast moving and relatively localized severe weather phenomena, such as tornadoes and flash floods, can be reported with sufficient accuracy to provide a useful warning. Where transient, localized weather phenomena is concerned, it is therefore even more important, if not essential, that warnings be issued by authorities in close proximity to the threatening weather event.

Furthermore, the warning method employed by the NOAA NWR system does not distinguish between an actual tornado warning (a tornado has actually been sighted) versus a severe storm that has a high probability of producing a tornado. This is because NOAA must rely on technical weather data from radar and satellite, and the data from these sources cannot confirm that a tornado has actually formed.

SOLUTION TO THE PROBLEM

Local governments currently rely almost exclusively upon outdoor siren systems to deliver tornado and/or other warnings of impending disaster events. These siren systems have serious inherent shortfalls in their effectiveness as tornado warning systems. The present warning system overcomes these shortfalls and achieves an advance in the field by providing a method for sending an effective warning signal to receivers in a predetermined area comparable to the area covered by a particular warning siren.

The present system comprises a transmitter for sending warning signals and a plurality of receivers which receive the signals. Cities or counties may be divided into subdivisions thereof called sectors, each of which represents an area that is selectively addressable by the transmitter. To avoid the "cry wolf" syndrome, larger municipalities do not want to send out a city-wide warning every time a tornado threatens one small part of the city. Therefore, in addition to a 'city code' or 'county code', the present system employs 'sector codes' that designate one or more smaller areas or sectors within the city, county or other coverage area.

Each of the receivers employed within the present system has a programmable sector code which has been programmed according to the location of the home or office in which it is placed. When activated, the transmitter sends radio frequency warning signals which contain digitally encoded information indicating the sector (as well as the city or county) to which the warning applies. Upon receiving a warning signal, each receiver that has been programmed with the sector code being transmitted responds by generating an audible alert or other warning signal.

In one embodiment, the transmitter sending the warning signal is connected to, and activated by, the same mechanism that activates a corresponding warning siren. Receivers used with the present system are programmed to receive warning information in an area the same size or larger than the siren is intended to cover audibly.

The present system provides a further improvement over an audio-only siren warning by alerting receivers in an area including that which the siren would audibly cover in an ideal situation; i.e., one wherein everyone within a predetermined area relative to a given siren would in fact receive the warning. When a local authority activates its tornado (or other emergency) warning siren(s), a transmitter is simultaneously activated to send out a signal carrying digitally coded information. Homes or offices that employ a compatible receiver in accordance with the present system will receive a warning alarm inside the home or office, alerting the occupants to take shelter immediately.

An important aspect of the present system is that the system is directly tied into the control unit or mechanism that controls/drives the warning sirens. Because the system transmits a digitally coded signal, residents in a particular area can program their receivers to respond only to a signal originating from the transmitter operated by their own local authority. The integration of the present system into an existing local siren warning system distinguishes it from the warning method employed by the NOAA weather radio system. This integration eliminates an enormous number of communication links and significantly improves reliability. It also improves warning delivery time—the decision to send a warning is made locally by officials who are in a position to gather local information from sources like storm spotters and local law enforcement officers and act on that information immediately. In addition, the present system functions as a true tornado warning system. NOAA does not distinguish between an actual tornado warning (a tornado has actually been sighted) versus a severe storm that has a high probability of producing a tornado. This is because NOAA must rely on technical weather data from radar and satellite, and the data from these sources cannot confirm that a tornado has actually formed. Although local authorities may use NOAA weather data, they may also use additional radar and satellite data plus direct information from local sources. The most important elements of the present system are local, including information sources, warning decision, warning delivery system.

An automatic receiver test signal is another significant aspect of the present system. A test signal is periodically transmitted to all receivers operational with the present system to insure that the receivers are functional at all times. None of the NWS or NOAA systems incorporate such a feature, because it would be practically impossible to manage it on a national platform. By not incorporating this type of test feature, reliability and user confidence are compromised with the aforementioned Government systems. Users have no way of knowing for certain that their NOAA unit will actually work when the time comes for it to deliver a warning. With the present system, the entire local system, including transmitters and receivers, is automatically tested on a frequent, periodic basis. This ensures that the present system is always operational in case of a severe weather emergency.

DETAILED DESCRIPTION

Figure 1:
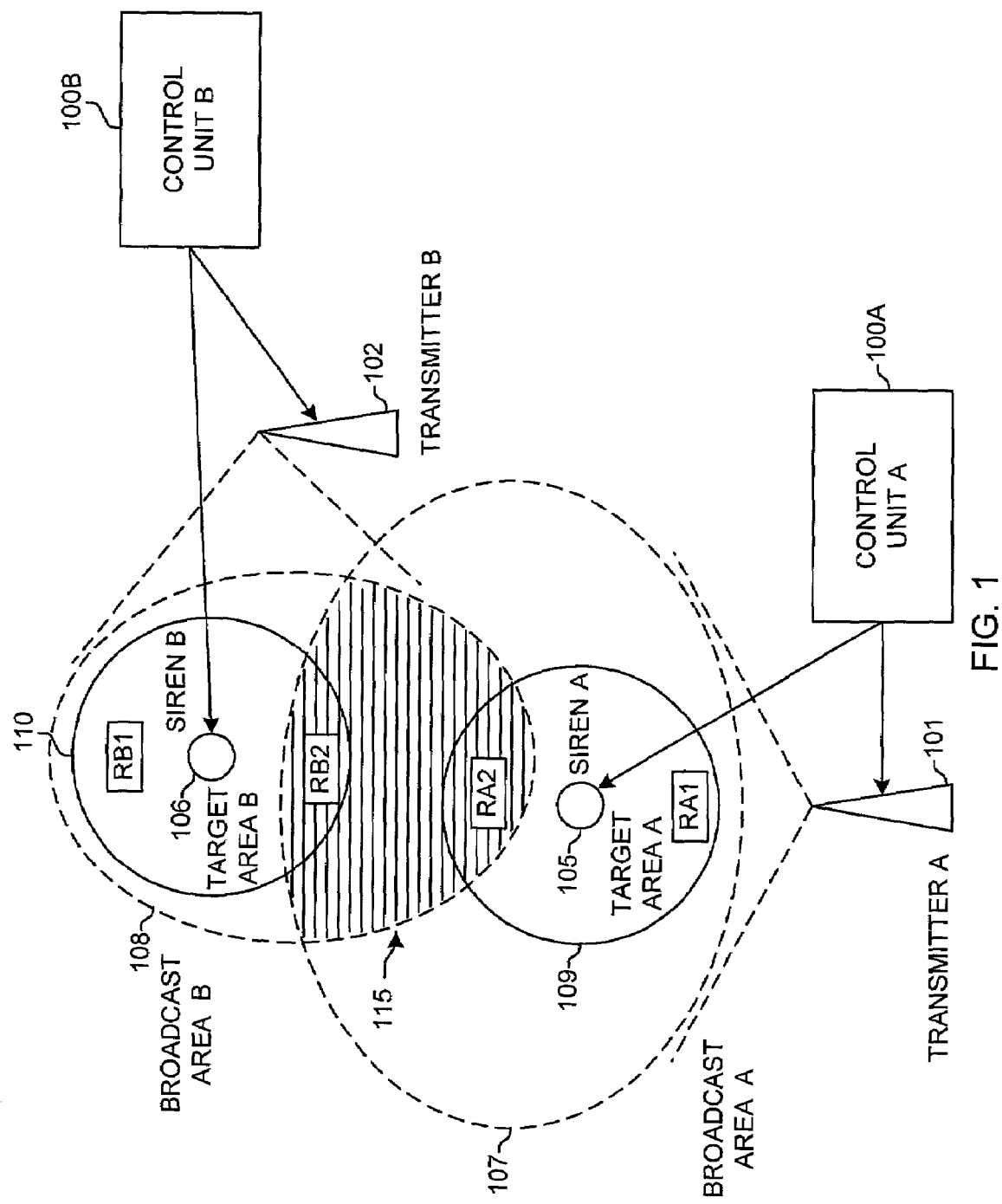
FIG. 1 is a conceptual illustration of the present warning system, showing interrelationships between exemplary components of the present system.

FIG. 1 is a conceptual illustration of a warning system in accordance with present invention showing interrelationships between exemplary components therein. This warning system may be employed by municipalities, counties or other local government authorities to warn residents of an imminent, potentially dangerous environmental situation, such as a tornado or other severe weather phenomenon. The present system transmits a digitally coded signal whereby residents in a particular area can program their receivers to respond only to a signal originating from a transmitter operated by their own local authority and intended for their specific geographic area.

As shown in FIG. 1, transmitter A (101), when activated, transmits a signal having sufficient signal strength to be detected and decoded by a receiver RA1/RA2 (described below with respect to FIG. 4) located in broadcast area A (107). Likewise, transmitter B (102) transmits a signal detectable in broadcast area B (108) by receivers located therein, e.g., RB1 and RB2. In the example of FIG. 1, target warning area A (109) and target warning area B (110) are in sufficiently close proximity that warning signals transmitted from transmitter A (101) and transmitter B (102) overlap significantly, as indicated by the shaded transmitter signal overlap area 115. However, as explained below, each receiver is programmed to respond only to signals originating from the transmitter designated to provide warning signals for the area in which the receiver is located. Therefore, the fact that a receiver in one target warning area also receives a signal intended for another warning area does not cause the receiver to generate a false alarm. In accordance with the present system, a target warning area comprises an area preferably at least as large as the area which a siren would cover in an ideal situation; i.e., one wherein everyone within a predetermined area relative to a given siren would in fact receive an audible warning.

Each warning signal transmitter in the present system is coupled to, and activated by, the same system or mechanism that activates a corresponding warning siren or group of warning sirens covering a particular geographic area. As shown in FIG. 1, transmitter A (101) and siren A (105) are coupled to control unit A (100A). Control unit A may be any system or device, such as a computer, capable of activating a siren (e.g., siren A) and controlling a transmitter such as transmitter 101.

The function of controlling the transmitter includes providing the digital data necessary for signal identification and for activating the transmitter to initiate a transmission containing the encoded information. Both transmitter A and siren A are activated to generate warning signals when the control unit to which they are connected is activated.

Receivers used with the present system are programmed to receive warning information in an area the same size or larger than the siren is intended to cover audibly. When activated, each transmitter 101, 102 transmits a warning signal that is detectable by a receiver (such as the receiver described below with respect to FIG. 4), programmed to respond to the warning signal, that is located within a predetermined area relative to the transmitter. Note that this area may be larger than the area practicably covered by a siren. Alternatively, the transmitter 101/102 sending a given warning signal may not necessarily be activated by a mechanism coupled to a siren, but the transmitter is nevertheless activated by an emergency warning system/mechanism controlled by a local municipality, county authority or local emergency preparedness authority.

For the purpose of the example depicted in FIG. 1, assume that target area A (109) is in the path of an approaching tornado, but target area B (110) is not. In response to the determination by local authorities that target area A is threatened by the tornado, control unit A (100A) is activated, which in turn activates tornado siren 105 and transmitter 101, both of which are coupled to the same control unit 100A. The transmitter (101) coupled to control unit 100A is programmed (or otherwise set up) to include the predetermined digital code for target area A in each warning signal transmission. Area A (as well as each of the other areas serviced by the system) may be considered to be equivalent to a 'sector', as defined below.

Receivers in area A (109) that have been programmed to respond only to signals encoded for area A will generate an audible and/or visual alarm upon receiving a warning signal from transmitter A (101) containing the sector code for target area A. In the present example, receivers RA1 and RA2 (in target area A) have been programmed to respond to a transmitted signal containing the appropriate code for target area A. Receivers in target area B that have been programmed to respond only to signals encoded for target area B will ignore all warning signals transmitted by transmitter A. Two such receivers are shown in FIG. 1 as RB1 and RB2. Note that, although receiver RB2 is located in the broadcast area (108) covered by transmitter A, RB2 will not generate an alert or other response to a transmission from transmitter A. Likewise, receiver RA2, located in the broadcast area (107) covered by transmitter A, will not generate an alert or other response to a transmission from transmitter B.

Figure 2:
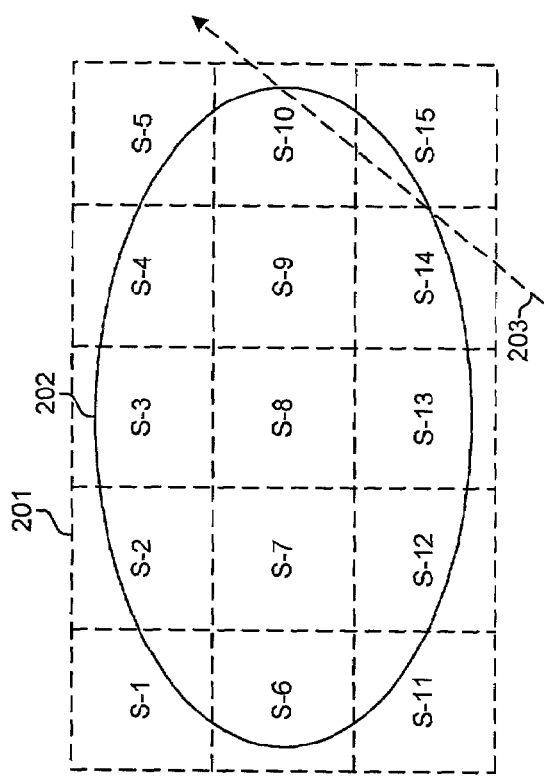
FIG. 2 is a diagram illustrating the sector code concept of the system.

FIG. 2 illustrates the sector code concept of the present system. The solid oval line 202 represents the outline of a geographic area, for example, city X. The dotted line grid 201 represents an exemplary set of geographic sectors established by city X, shown as sectors S-1 through S-15. In accordance with an exemplary aspect of the present system, each of the sectors corresponds to a target warning area, such as area 109 or area 110 in FIG. 1. For the purpose of the present example, assume that city X is large enough that a tornado, indicated by dashed arrow 203, threatens residents along its extreme southeast edge, but does not present a threat to the residents in the rest of the city. In this case, the city selects and transmits a set of 'sector codes' that will trigger an alert response from only those receivers, located in sectors S-10, S-14 and S-15, that have been programmed with corresponding sector codes.

Residents in and around the city who have set (programmed) the sector code in their receiver according to predefined indicia for their area, such as a numerical code indicated on a map published by the city, will receive warnings for their specific area, but they will not be disturbed by warnings for other parts of the city. This receiver-selectable sector code method can be applied to cities, counties or any other geographic area where local authorities want to issue warnings that are limited to specific areas or sectors within their transmitter coverage area.

The present system provides the user of a particular receiver with the optional capability of setting a 'universal city/county code' in a receiver so that the receiver will respond to any warning transmitted from a transmitter sending signals on the frequency to which the receiver is tuned, regardless of which city, county or other authority initiated the warning. In this mode, the receiver ignores sector code information, regardless what sector code the user might set. This particular option allows the receiver to be mobile in the sense that it can be moved to a different coverage area and will still receive and respond to a warning, even though the user has not pre-programmed the receiver with the local sector code for that coverage area.

Figure 3:
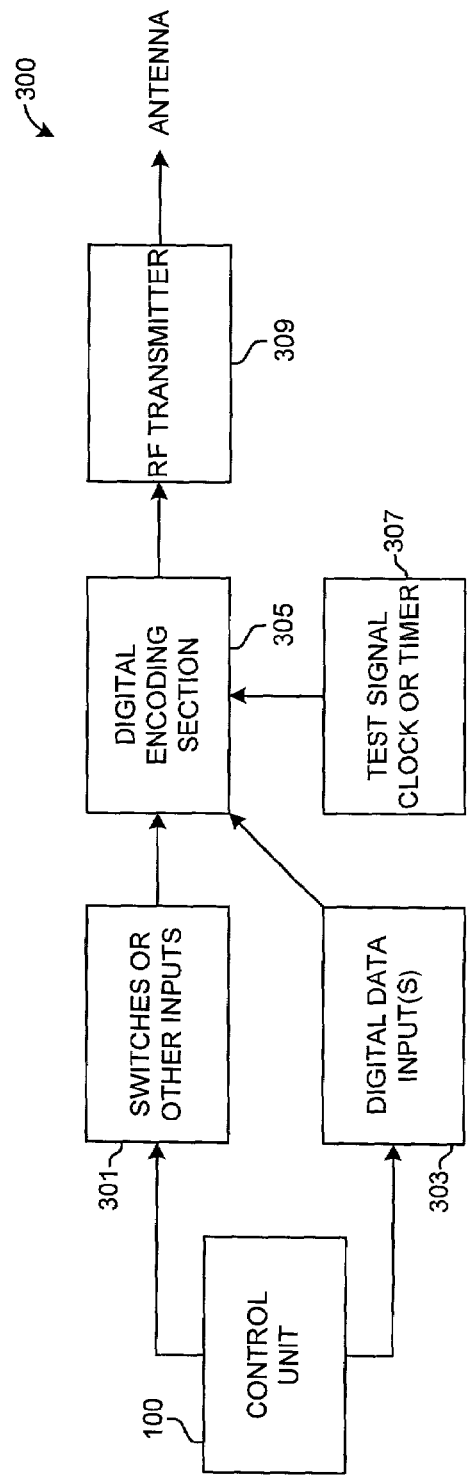
FIG. 3 is a block diagram showing exemplary elements of a transmitter in accordance with present system.

FIG. 3 is a block diagram showing exemplary elements of a transmitter 300 in accordance with the present system. The following description is applicable to transmitters 101 and 102 shown in FIG. 1. When local authorities make a decision to issue a tornado warning, the local transmitter 300 is activated at the same time as the local outdoor warning siren or sirens are triggered. The transmitter 300 can be activated in a variety of ways as indicated by Blocks 100, 301, and 302 in FIG. 3. For example, dry contact input(s) from control system 100, or the like, may be used to sense an activating signal from control unit 100. Digital data corresponding to the system codes described below is also input from control unit 100, or alternatively, via some other device such as a computer (not shown). A manual pushbutton or switch (301) may also be employed to activate the transmitter 300, in case of a control unit malfunction, for example.

Digital encoding section 305 encodes the digital information to be sent by the transmitter in a format suitable for the particular protocol employed by the RF (radio frequency) transmitter element 309. In an exemplary embodiment, this information includes the following data:

(a) a 'system identification code' identifying this signal as a valid system transmission;

(b) a signal 'type code', indicating whether this signal is a test signal, a tornado warning, or some other type of warning signal;

(c) a 'city/county code', which identifies this signal as originating from a certain city, county or other local authority; and (d) a 'sector code', which identifies this signal as a warning intended only for a specific geographic sector within the total area served by the local city/county transmitter system.

It should be noted that transmitter 300 may be a transmitter 'system' for serving an area comprising more than one sector. In this case, the RF transmitter element 309 could consist of a single transmitter, multiple transmitters or one master transmitter and one or more repeaters. In the situation wherein the area for which the warning to be issued includes more than one sector, a separate warning signal must be encoded and transmitted for each of the target sectors. This may be accomplished by locating a transmitter in every sector, and issuing a warning signal for each specific one of the affected sectors by the transmitter located in that sector. Alternatively, a single transmitter may be employed to cover a plurality of sectors by alternately transmitting each of the appropriate sector codes in cyclical succession; i.e., effectively multiplexing the transmitted sector codes.

Block 307 of FIG. 3 illustrates a clock or timer circuit that causes the transmitter system to send periodic, timed test signals. Test signals typically comprise the system identification code and the city/county code. As explained below, the receivers generate a 'trouble alarm' if this test signal is not received within the test signal timer window established for the system.

Block 309 of FIG. 3 illustrates the transmitter element that transmits the RF signal that carries the digitally encoded warning information to the receivers. In an exemplary embodiment, the RF signal frequency is in the 800 to 900 MHz band, but the present system will also function effectively at lower frequencies such as the UHF band (around 400 MHz), as well as at frequencies above 900 MHz, but below microwave frequencies. A transmitter having an output power of approximately 10 to 15 Watts provides adequate range for most areas. For example, an area the size of Oklahoma City could be adequately covered by one master transmitter in the 10 to 15 Watt power range connected to a network of a 6 to 10 repeaters of the same power level. Each of these repeaters could, for example, be positioned in a location corresponding to one of the sectors shown in FIG. 2. Alternatively, the present system could be set up to cover an equivalent (or larger) area using a plurality of lower power transmitting devices (with power as low as approximately 1 Watt) simply by using additional repeaters.

Figure 4:
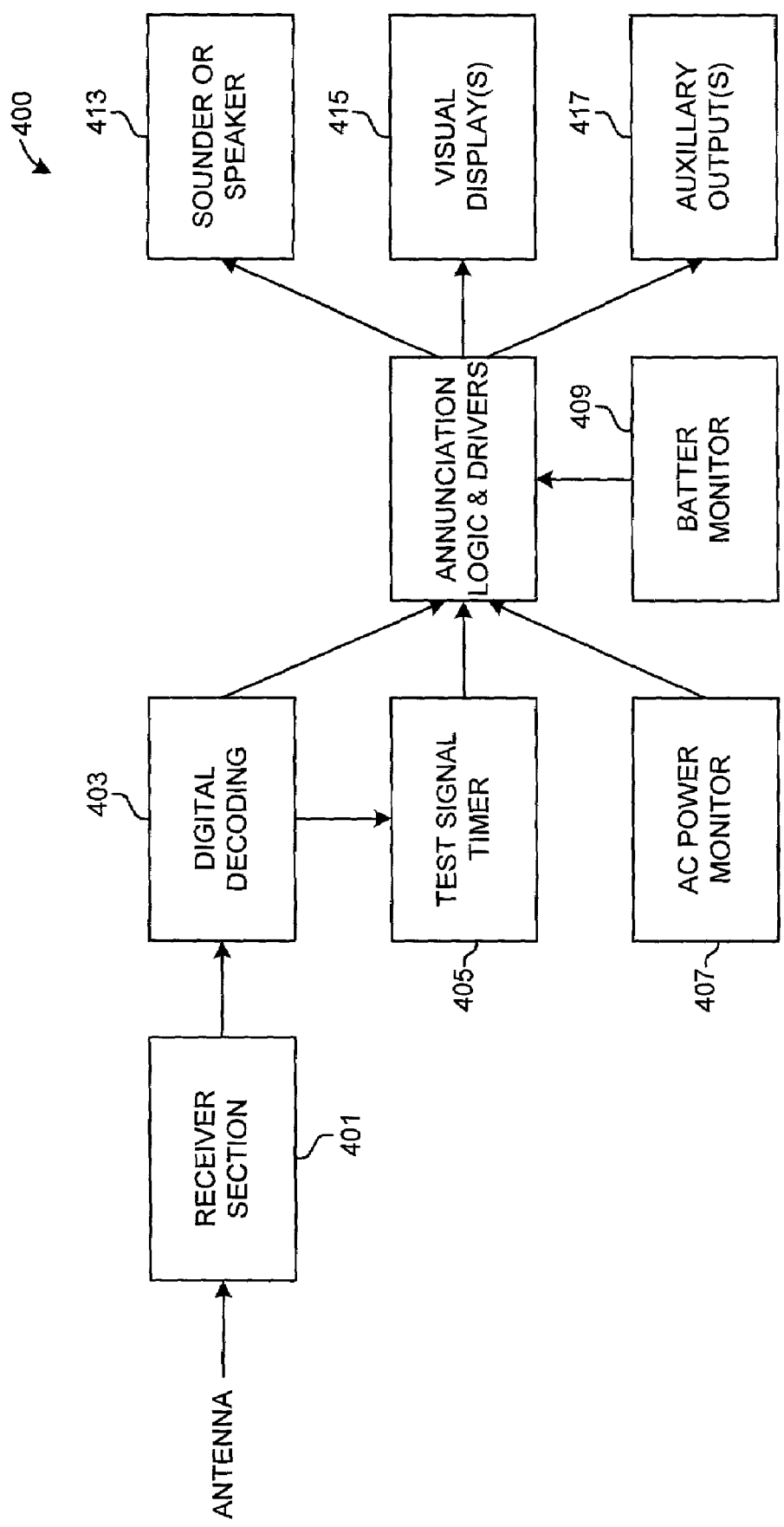
FIG. 4 is a block diagram showing exemplary elements of a receiver used with present system.

FIG. 4 is a block diagram showing exemplary elements of a receiver 400 in accordance with present system. The following description is applicable to all of the receivers (RA1, RA2, RB1, RB2) shown in FIG. 1. Signals transmitted by transmitter 300 are received (detected) by receiver section 401 and are processed by digital decoding element ('decoder') 403. When decoder 403 receives a signal from transmitter 300, it initially decodes the system identification code, type code, city/county code, and sector code (described above) included in the signal. Decoder 403 next processes the decoded information in accordance with the following exemplary sequence of steps:

(a) The received system identification code is checked to determine whether the signal is a valid system transmission. If not, the signal is ignored, and no further action is taken. If the signal is valid, then the decoder proceeds with step (b).

(b) The received signal type code is checked to determine whether the signal is a test signal, a tornado warning, or some other type of signal. Once determined, this information is sent to the annunciation logic element 411 (described below). If the signal is determined to be a test signal, the decoder transfers control to logic element 411. Otherwise, decoder 403 then continues with step (c).

(c) The received city/county code is checked to determine whether the signal matches the city, county or other local authority code pre-programmed into the receiver 400. If not, the signal is ignored, and no further action is taken. If a code match is found, the decoder proceeds with step (d).

(d) The received sector code is checked to determine whether the signal matches the sector code programmed into the receiver 400. If not, the signal is ignored, and no further action is taken. If a sector code match is found, the decoder transfers control to annunciation logic element 411, which determines the type of warning to be generated, and generates the appropriate warning alarm.

In an exemplary embodiment of the present system, the system identification code and the type code for a given receiver 400 are manually set by the user via DIP switches or the like. In an alternate embodiment, the system identification code and the type code are hard-coded into the receivers and are not modifiable by the user. The user is nevertheless able to set the city/county code and the sector code.

Block 411 in FIG. 4 comprises output logic and driver circuits that control and drive the receiver's annunciation devices in accordance with information sent from decoder 403.

Blocks 407 and 409 in FIG. 4 illustrate the circuits that monitor the receiver's (normal) AC power and standby battery systems, respectively. In the event of an AC power failure, the receiver will shut down certain displays, such as an 'OK' indicator light, to conserve standby battery power. The receiver also constantly monitors and periodically tests the standby battery. If the battery becomes weak, the receiver delivers special audio and/or visual warnings to alert the user that the battery is weak and needs to be replaced or recharged.

Blocks 413, 415, and 417 in FIG. 4 illustrate exemplary types of output or annunciation devices that could be used to warn the user of various alarm and trouble conditions. These devices include LCD alphanumeric displays, LED displays, buzzers, beepers, sirens, voice speakers, and the like. The annunciation devices may also include digital, voltage, or dry contact outputs that can be used to trigger other annunciation devices such as a high output strobe light designed to warn the hearing impaired.

Block 405 comprises the test signal timer. Timer 405 is reset to zero and starts its timing cycle again each time a valid test signal is received. The present system incorporates a method for continuously insuring the integrity of the entire transmitter/receiver system. Local transmitter systems automatically transmit a periodic test signal encoded with a special 'test code'. This test code is a unique sector code or other unique code that does not set off an alarm in the receivers. In one embodiment, the test code is a signal 'type code'. When received, the test code resets timer 405. The duration of the timer is a value that is slightly greater than the interval between test signal transmissions. For example, the receiver timer could be 25 hours for a system that transmits a test signal every 24 hours, or it could be one hour and one minute for a system that transmits a test signal every hour. If timer 405 times out, the receiver activates a distinct 'trouble alarm' indication to notify its user that something in the system has failed. The failure could be in the receive circuitry of the receiver, or it could be in the local transmitter system. In either case, the system provides clear notice of the failure.

An additional unique feature of the receiver 400 is that the receiver does not include a power ('on/off') switch, and therefore the receiver can be powered down only by disconnecting both the AC power source and the battery.

While preferred embodiments of the present invention have been shown in the drawings and described above, it will be apparent to one skilled in the art that various embodiments of the present invention are possible. For example, the specific configuration of the receiver and transmitter as well as the particular types of warnings for which notification is provided described above should not be construed as limited to the specific embodiments described herein. For example, the present system could also be used to provide warnings for severe storms, earthquakes, and other emergency situations. Modification may be made to these and other specific elements of the invention without departing from its spirit and scope as expressed in the following claims.

What is claimed is:

1. A system for providing notification of severe weather, the system comprising:
   a transmitter configured to transmit at least one notification signal for the notification comprising type data indicating a type of severe weather and area designation data for a specific area comprising at least one member of a group consisting of sector data indicating a sector in which the severe weather is expected and city/county data indicating a city/county in which the severe weather is expected and to transmit a test signal at a regular interval; and
   a plurality of receivers each configured to receive and process the at least one notification signal and, if configured to cover an area corresponding to the specific area identified in the area desienation data, to cause an alarm to be triggered for the type of severe weather for the specific area, wherein each of the receivers comprises a timer configured to time out in a period greater than the regular interval of the test signal, to generate a trouble alarm upon timing out, and to reset upon receiving the test signal.

2. The system of claim 1, further comprising an emergency warning mechanism configured to activate the transmitter for transmitting the at least one notification signal and to active a siren when the transmitter is activated.

3. The system of claim 2, wherein the emergency warning mechanism comprises a control unit configured to activate the transmitter and the siren.

4. The system of claim 2, wherein the omergency warning mechanism is controlled by a local authority.

5. The system of claim 1, further comprising at least one authority to activate the transmitter, the authority comprising at least one member of a group consisting of a municipality in which the specific area is located and a county in which the specific area is located.

6. A system for providing notification of severe weather for a specific area comprising:
   a warning siren;
   a transmitter configured to transmit a notification signal for the notification comprising weather sector data indicating the specific area in which the severe weather is expected and type data indicating a type of the severe weather and to transmit a test signal at a regular interval; and
   a plurality of receivers in the specific area tuned to a frequency transmitted by the transmitter, each programmed with receiver sector data corresponding to a geographic area and each configured to cause an alert to be triggered for the type of severe weather if the weather sector data matches the receiver sector data, wherein each of the receivers comprises a timer configured to time out in a period greater than the regular interval of the test signal, to generate a trouble alarm upon timing out, end to reset upon receiving the test signal;
   wherein the siren and the transmitter are activated by an entity authorized to provide the notification for the specific area.

7. The system of claim 6, wherein the receiver sector data for each receiver comprises a code for a location of the receiver.

8. The system of claim 6, further comprising a control unit configured to active the transmitter and the siren.

9. A system for selective notification of severe weather for a specific area comprising:
   a warning siren;
   a transmitter configured to transmit at least one notification signal for the notification and to transmit a test signal at a regular interval, the notification signal comprising sector data indicating the specific area in which the severe weather is expected and type data indicating a type of the severe weather;
   a control unit configured to activate to siren and the transmitter in response to an indication of the severe weather for the specific area; and
   a plurality of receivers each configured to receive the notification signal and to cause an alarm to be trigger for the type of severe weather if the sector data indicates the receiver is to trigger activation of the alarm for the specific area, wherein each of the receivers comprises a timer configured to time out in a period greater than the regular interval of the test signal, to generate a trouble alarm upon timing out, and to reset upon receiving the test signal.

10. A method for selective notification of severe weather for a specific area comprising the steps of:
    transmitting a notification signal for the notification comprising type data indicating a type of the severe weather and area designation data comprising at least one member of a group consisting of sector data indicating a sector in which the severe weather is expected and city/county data indicating a city/county in which the severe weather is expected;
    receiving the notification signal for at least one receiver and, in response, causing a warning alarm to be triggered for the type of weather if the at least one receiver is programmed with the area designation data; and
    transmitting, at a regular interval, a test signal that prevents a trouble alarm in the at least one receiver from being generated if the test signal is received by the at least one receiver.

11. The method of claim 10, wherein:
    the area designation data comprises a code indicating the specific area, and the at least one receiver is located in the specific area.

12. The system of claim 10, further comprising activating the transmitter from an authority in at least one member of a group comprising a county in which the specific area is located and a municipality in which the specific area is located.

13. A receiver for receiving a notification signal of severe weather for a specific area and a test signal, the notification signal comprising type data indicating a type of severe weather and area designation data indicating the specific area of the severe weather, the area designation data for the specific area comprising at least one member of a group consisting of sector data indicating a sector in which the severe weather is expected and city/county data indicating a city/county in which the severe weather is expected, the receiver comprising:
    a timer configured to time out in a period greater than a regular interval within which the test signal is to be received, to generate a trouble alarm upon timing out, and to reset upon receiving the test signal; and
    a decoder configured to decode the type data to determine the type of the severe whether, to decode the area designation data to determine if the receiver is configured to cause an alarm to be triggered for the specific area in which the severe whether is expected, and, if so configured, to cause the alarm to be triggered for the specific area indicated by the area designation data.

14. The receiver of claim 13, wherein the receiver is normally connected to an AC power source and a backup battery and can be powered down by disconnecting the AC power source and the battery.

15. The receiver of claim 13, wherein the receiver is tuned to receive the notification signal from a transmitter that is activated by an emergency warning mechanism controlled by a local authority.

16. The receiver of claim 13, wherein the receiver is tuned to receive the notification signal from a transmitter that is activated with a warning siren by an emergency warning mechanism controlled by a local authority.

17. The system of claim 16, wherein the local authority comprises an authority in at least one member of a group comprising a county in which the specific area is located and a municipality in which the specific area is located.

18. A method for triggering an alarm in response to notification, by a local authority, of severe weather in a specific area, the method comprising the steps of:

receiving the notification comprising a signal containing a system identification code, a type code, a city/county code, and a sector code;

(a) checking the received system identification code to determine whether the signal is a valid transmission;

(b) checking the received type code to determine whether the signal is a test signal or a severe weather warning;

(c) continuing with step (h) if the signal is a test signal;

(d) checking the received city/county code to determine whether the signal matches a corresponding pre-programmed code;

(e) checking the received sector code to determine whether the signal matches a corresponding pre-programmed code;

(f) generating a warning alarm if corresponding codes are found in steps (d) and (e), otherwise, ignoring the notification; and (g) generating a trouble alarm if the test signal has not been received within a predetermined interval; otherwise, (h) resetting a tiner to the predetermined interval upon receiving the test signal to prevent the trouble alarm from being generated.

* * * * *